United States Patent [19]

Joice

[11] 4,021,291

[45] May 3, 1977

[54] AUTOMATIC HOT NEEDLE ATTACHMENT FOR BAG WICKETER

[76] Inventor: Richard L. Joice, c/o Universal Machinery Corporation, 8955 Fullbright Ave., Chatsworth, Calif. 91311

[22] Filed: Oct. 9, 1975

[21] Appl. No.: 621,119

[52] U.S. Cl. .............................. 156/513; 156/252; 156/515; 156/556

[51] Int. Cl.$^2$ ........................................ B32B 31/00

[58] Field of Search .......... 156/251, 515, 513, 252, 156/253, 272; 83/16, 171, 556, 560, 553, 558, 518; 214/1 BV

[56] References Cited

UNITED STATES PATENTS

| | | | |
|---|---|---|---|
| 2,244,550 | 6/1941 | Chandler | 83/16 X |
| 2,275,612 | 3/1942 | Chandler | 83/16 X |
| 2,582,094 | 1/1952 | Balsam et al. | 83/560 |
| 2,704,123 | 3/1955 | Williams | 83/171 |
| 2,973,797 | 3/1961 | Sylvester | 83/171 X |
| 3,021,947 | 2/1962 | Sylvester et al. | 156/253 UX |
| 3,276,939 | 10/1966 | Traubach | 156/513 |
| 3,407,105 | 10/1968 | Staats et al. | 156/513 |
| 3,503,097 | 3/1970 | Krupp | 83/171 X |
| 3,712,161 | 1/1973 | Valente | 83/558 X |
| 3,758,355 | 9/1973 | Witherow | 156/513 X |

FOREIGN PATENTS OR APPLICATIONS

| | | | |
|---|---|---|---|
| 2,060,777 | 5/1971 | France | 156/253 |

*Primary Examiner*—David A. Simmons
*Attorney, Agent, or Firm*—Allan M. Shapiro

[57] ABSTRACT

Polymer composition bags are located in a stack with the holes in the lips of lip bags engaged on wickets. When a stack of bags is so located, it is supported by an anvil, and a tamper foot comes down adjacent the anvil to clamp the stack of bags. A hot needle penetrates the lips on the stack of bags to tack-weld the bags together so that they may be handled as an integral unit, but bags can be individually removed at the bag-filling station.

14 Claims, 10 Drawing Figures

AUTOMATIC HOT NEEDLE ATTACHMENT FOR BAG WICKETER

BACKGROUND OF THE INVENTION

1. Field of the Invention

This invention is directed to an automatic hot needle station in polymer composition material bag manufacturing equipment for securing a stack of wicketed bags together by clamping the lips of the stack and penetrating the lips with a hot needle for tack-welding the bags together.

2. Description of the Prior Art

Automatic bag-making machines for making bags out of synthetic polymer composition material are well-known in the art. Such machines receive polymer composition film, such as polyethylene film, and perform the necessary operations on the film to produce a new bag. Often bag making comprises folding the film and sealing several edges. A common bag is folded over, and the sides are welded with one of the open edges extending beyond the other to form a lip. This lip is helpful in bag filling and handling and often contains wicket holes for handling the bags by wicketing as they are produced. In the handling of these bags from the bag-making machine, automatic wicketing equipment is employed. Such wicketing equipment includes a pair of wicket fingers and means for positioning the newly created bag with its holes engaging on the wickets. Such a structure is shown in Tonus U.S. Pat. No. 3,894,636.

In removal from the wickets, it is customary for the operator to manually insert wires through the wicket holes parallel to the wickets for the handling of a stack of bags. This manual effort requires additional labor time and is especially not advantageous in those cases where the bag-filling machine cannot employ a stack of bags which have wires through the wicket holes. If there is no restraint for a stack of bags, the bags can be misaligned or even dropped because of the slippery character of the bag material.

While it is known that the bag material can be welded together and, in fact, the bag-making machinery employs the weldability of the polymer composition material to seam up the bag, the employment of automatic equipment for attaching the bags together in a stack by means of a hot needle device has not been previously achieved.

SUMMARY OF THE INVENTION

In order to aid in the understanding of this invention, it can be stated in essentially summary form that it is directed to an automatic hot needle device for attaching a stack of polymer composition bags together while they are on the bag wicketer. The device includes an anvil for supporting the bags, a tamper foot for pressing down on the bags with respect to the anvil, and a hot needle for penetrating the lips of the bag for welding the lips together at the point of penetration.

It is thus an object of this invention to provide an automatic hot needle device preferably employed as an attachment for a bag wicketer so that automatically wicketed bags are then automatically welded together by the penetration of a hot needle through the bag lips. It is another object to provide an economic and trouble-free automatic hot needle device for attaching a plurality of polymer composition bags together in a stack by penetration by a hot needle to the lips of the stacked bags. It is a further object to provide a hot needle device for integration into a polymer composition material bag production line so that it is controlled by the production line and automatically attaches the stacked bags together as part of the production line sequence so that the stacked bags can be then handled as a unit without need for wires or wickets for storage, shipment, and placement of the unit of bags on automatic bag-filling equipment.

The features of the present invention which are believed to be novel are set forth with particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 9 is an enlarged section through a portion of the stack of bags showing the hot needle weld.

FIG. 10 is a plan view of the weld hole, as seen along the line 10—10 of FIG. 9.

DESCRIPTION OF THE PREFERRED EMBODIMENT

Figure 1:
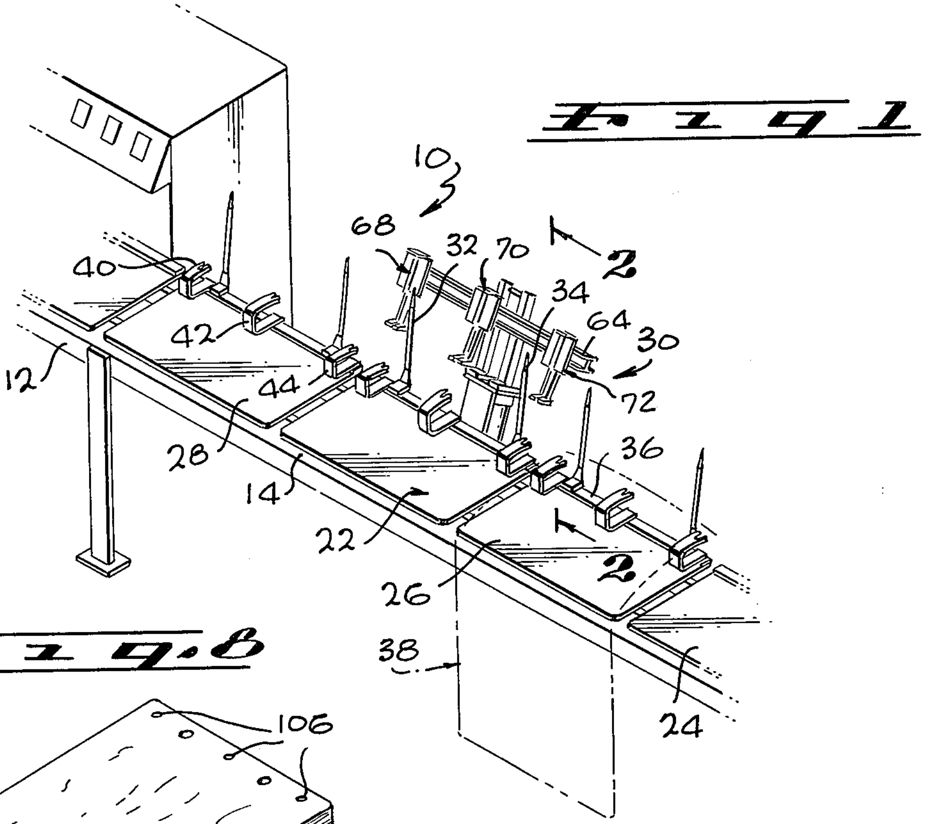
FIG. 1 is a perspective view of a bag-making line showing the portion thereof with the automatic hot needle device of this invention.
Figure 2:
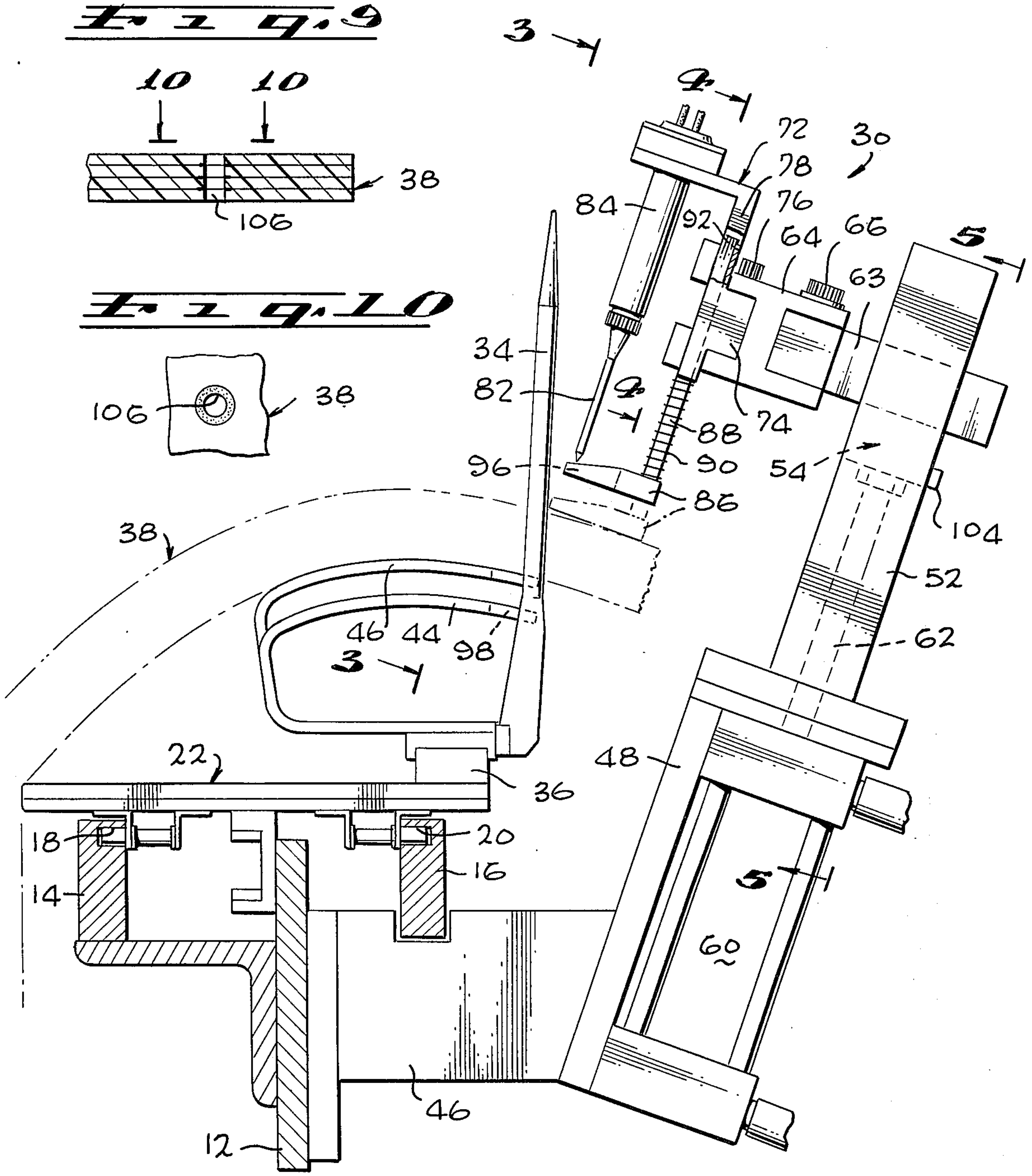
FIG. 2 is an enlarged section taken generally along the line 2—2 of FIG. 1 showing the automatic hot needle device of this invention in side-elevational form.

FIG. 1 illustrates part of a polymer composition bag-manufacturing line 10. As is seen in FIG. 2, machine frame 12 carries rails 14 and 16 which have longitudinal grooves or tracks 18 and 20 therein. Carriage 22 is one of a series of carriages 22, 24, 26 and 28 which move along the track and are indexed from station-to-station. The carriage at station 22 is at the station which has the automatic hot needle device 30.

Figure 6:
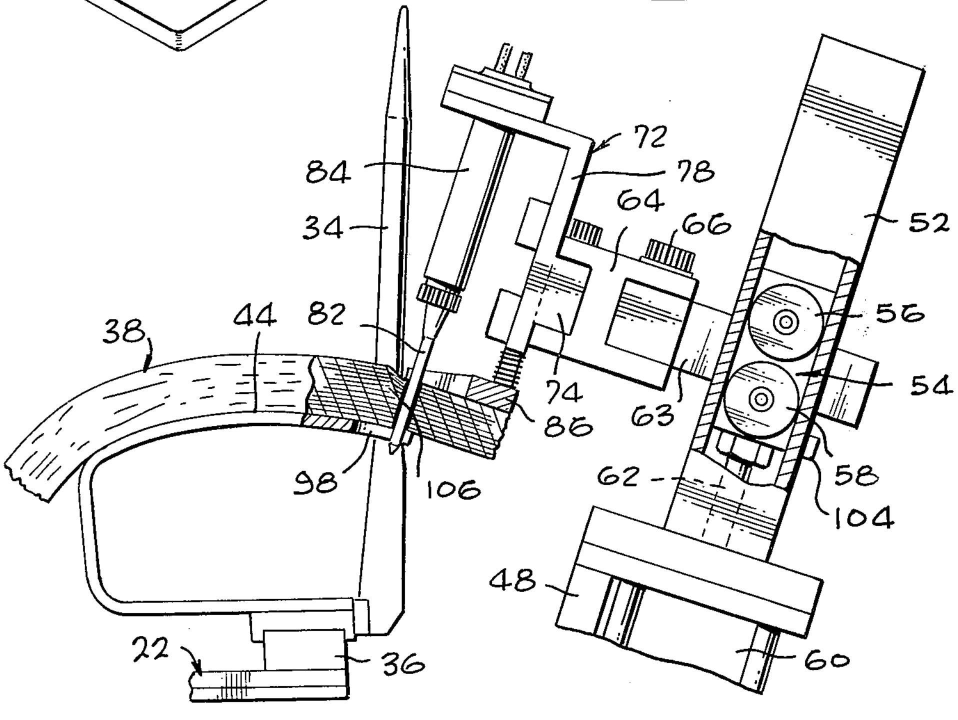
FIG. 6 is a view similar to FIG. 2, with parts broken away, showing the automatic hot needle device with the needle inserted.
Figures 3, 4:
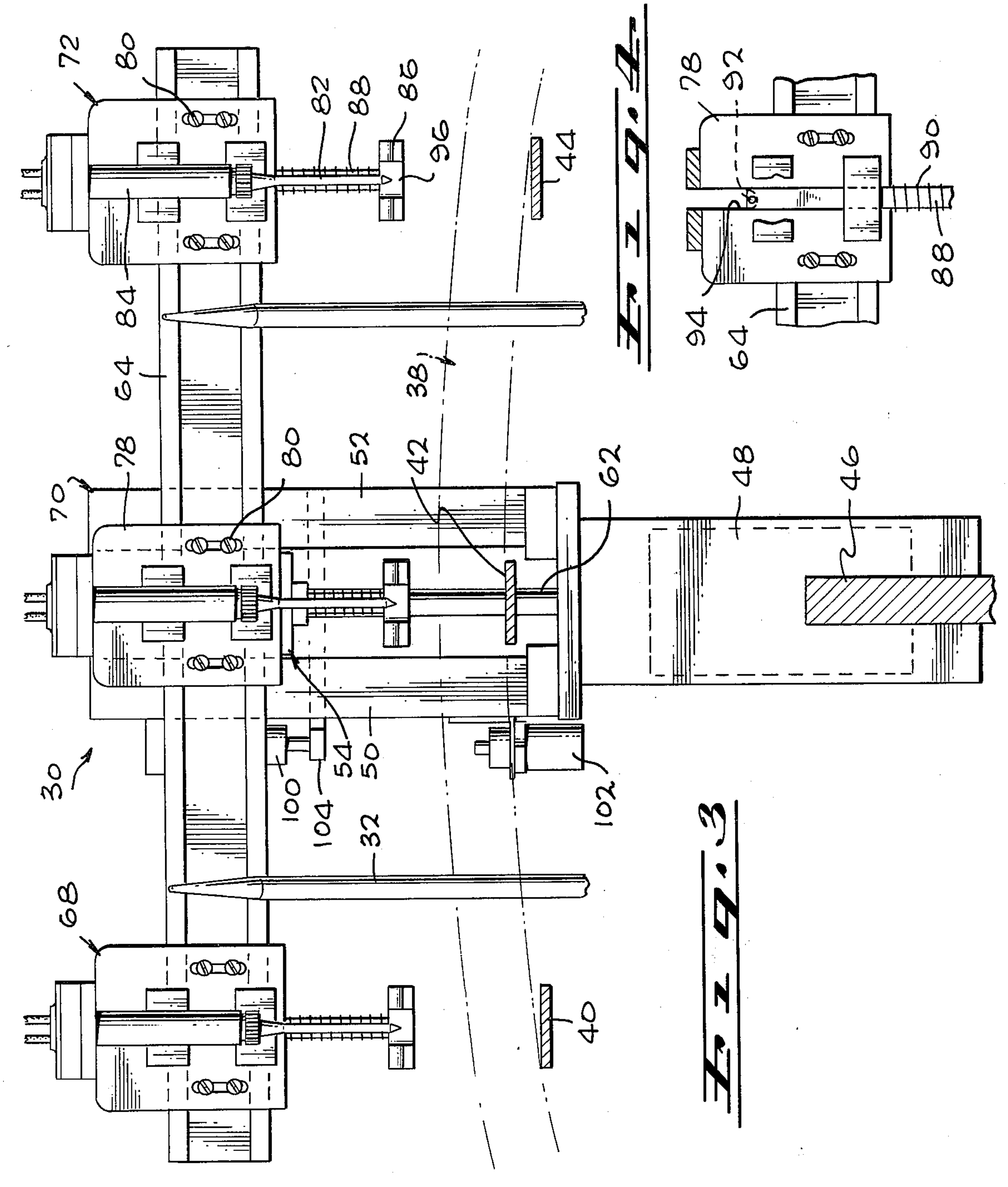
FIG. 3 is generally a front view of the automatic hot needle device, as seen along the line 3—3 of FIG. 2.
FIG. 4 is a detailed section, with parts broken away, taken generally along the line 4—4 of FIG. 2.

To the right, out of the drawing in FIG. 1, is the bag-making machine. A wicketer, such as the wicketer shown in Tonus U.S. Pat. No. 3,894,636, receives the bags as they are manufactured and places them on wickets. Wickets 32 and 34 (see FIGS. 1, 2 and 3) are mounted on bar 36 which is secured to the top of carriage 22. When these wickets are at the wicketing station, the bags are positioned over the wickets to be laterally held in position by the wickets. The group of bags 38 is shown as being positioned on the wickets in FIGS. 2 and 6 and is shown in FIG. 9 after the group has been welded by operation of the automatic hot needle device 30. Also mounted on bar 36 are three anvils 40, 42 and 44 which are arcuately formed to form a support surface for the group of bags 38 on the wickets. As is seen in FIGS. 2 and 3, center anvil 42 is slightly higher than the others. Each of the anvils has a curved top so that the bags can drape from the wickets over the anvils and over the front of the respective carriage. Thus, by means of these carriages, the bags are transported from station-to-station away from the wicketer.

Figure 5:
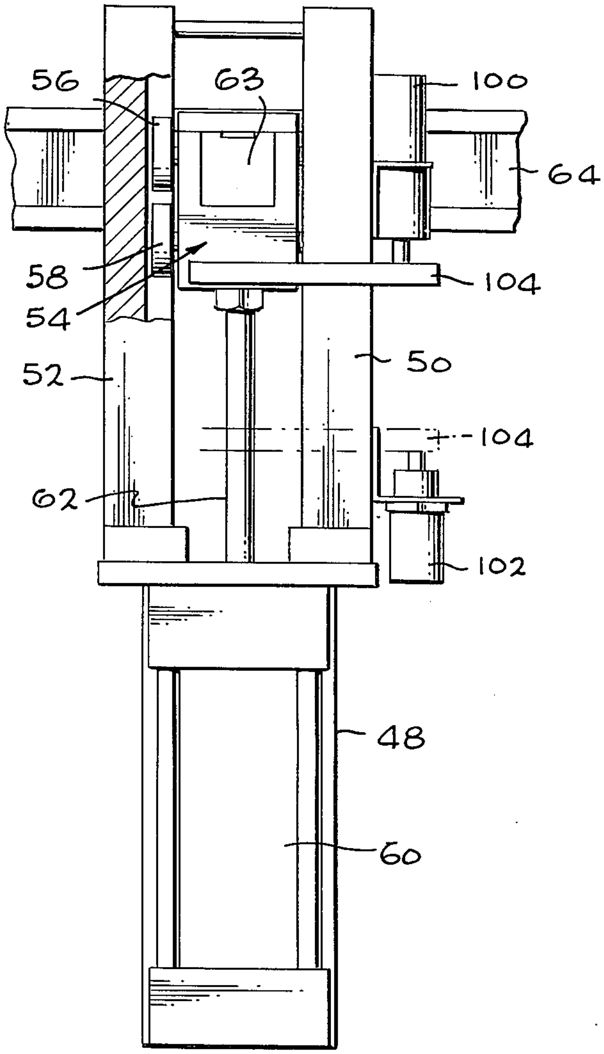
FIG. 5 is generally a rear-elevational view, with parts broken away, as seen generally along the line 5—5 of FIG. 2.

The automatic hot needle device 30 is mounted on machine frame 12 by means of bracket 46 to form the station which will be the hot needle welding station. Frame 48 extends upward from bracket 46 and carries guide rails 50 and 52 extending upward therefrom. Guide rails 50 and 52 are channel-shaped with the open channel facing interiorly. Carrier 54 is positioned between guide rails 50 and 52. Guide rollers 56 and 58 (see FIGS. 5 and 6) are positioned within the channels of the guide rails so that carrier 54 can smoothly move up and down along the line defined by the guide rails. Motion is provided by air cylinder 60 which has a piston therein dividing the cylinder in two volumes and has a piston rod 62 secured to the piston and extending from the cylinder. Piston rod 62 is secured to carrier 54 so that selective delivery of air under pressure to opposite sides of the piston causes motion of the carrier along its guide rails.

Cross slide 63 is positioned in a transverse slot through carrier 54 so that it can be moved in and out with respect to the carrier and is secured in the carrier by means of a machine screw in clamping engagement.

Crossbar 64 is H-shaped with cross-slide 63 extending into the rear channel of the crossbar. Machine screws 66 pass through slots which are longitudinal with respect to crossbar 64 and screw into cross-slide 63 so that the crossbar is longitudinally adjustable along its own length, which is transverse to the direction of movement of carrier 54.

There are three hot needle assemblies mounted on crossbar 64. As seen in FIGS. 1 and 3, hot needle assemblies 68, 70 and 72 are secured on crossbar 64. Each of the hot needle assemblies is the same so that a description of hot needle assembly 72 seen in FIGS. 2 and 6 and on the right-hand end of FIGS. 1 and 3 suffices. Block 74 inserts into the front channel of crossbar 64. Block 74 is selectively positionable anywhere along the length of the crossbar and is secured in place by means of clamping machine screw 76. Needle mount 78 (see FIGS. 2, 3, 4 and 6) is secured to the front of block 74 by means of machine screws 80 which engage through the slot seen in FIGS. 3 and 4 for adjustment purposes. Needle mount 78 has forwardly extending needle mount platform at its top for mounting of needle 82. Heater 84 is thermally attached to needle 82 and is controlled to maintain the proper needle temperature. A cover is appropriately installed over heater 84 to protect the operator against inadvertently touching the hot body of the heater.

A tamper foot is provided on each of the needle mounts. Tamper foot 86 is mounted on tamper bar 88 which is slidably mounted on needle mount 78 (see FIG. 4) and is spring-urged into the extended downward position by means of tamper spring 90 which engages around tamper bar 88. This urges the tamper foot to the downward position where it is stopped by pin 92 (see FIG. 4) engaging on a concave abutment in slot 94 formed in plate 78 in FIG. 4.

Figure 7:
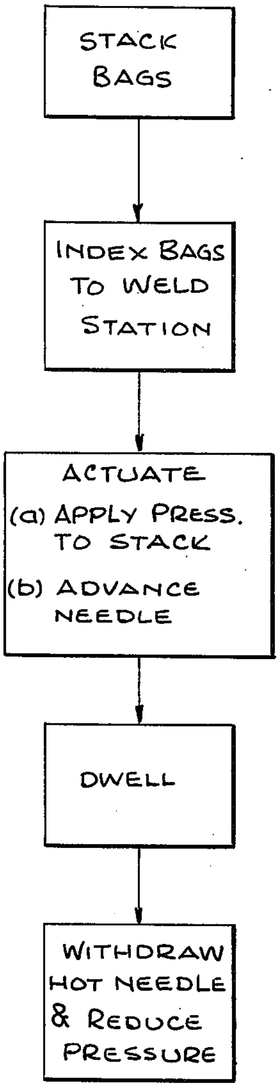
FIG. 7 is a flow diagram showing the manner of operation of the automatic hot needle device.

The flow diagram of FIG. 7 outlines the broad steps in the operation of the hot needle attachment and illustrates that first the bags are stacked (as by an automatic wicketing machine, as previously discussed). Whe the desired number of bags is wicketed (and such can be controlled by an automatic counter), the whole line of carriages is indexed. During indexing, carrier 54 is raised and, due to the raised position and the angle of the guide rails 50 and 52, the tamper or presser feet are out of the way of the wickets which are advancing from station-to-station. When the wicketed bags are positioned at the automatic hot needle device station, the hot needle device is automatically actuated. The hot needles are already hot, and actuation comprises introduction of air into the side of the cylinder which causes downward motion of carrier 54 to move the needles and the presser feet downward. As is seen in FIG. 3, with the presser feet in their extended position, they are slightly below the tip of the hot needles. Thus the presser feet engage bags the gas before the needle. The presser feet are configured with a needle notch 96 therein to receive the hot needle, and the presser feet are positioned so that they directly engage over the ends of the anvils so that the presser feet directly oppose the anvils. Each of the anvils also has a notch therein, such as notch 98 in anvil 44 (see FIGS. 2 and 6), and that notch is also aligned with the needle. As crossbar 64 moves toward the stacked bags, first the presser feet engage the bags and squeeze that portion of the stack of bags which is positioned between the presser feet and the anvils. This position of the presser foot is shown in dotted lines in FIG. 2. The advance of the needles is quite slow, depending on the thermal capacity of the hot needle and on the temperature and thermoplastic characteristics of the bag material. A downstroke for a total period of 12 seconds is in the correct range for the usual stack of bags. As the crossbar 64 and the needles carried thereon come down, the presser feet more firmly compress the stack of bags as the needle advances. At the lowermost position, the needle dwells for a period in the order of 4½ seconds. Thereupon, the upstroke is commenced by reversing the air on the cylinder. Upstroke can be accomplished in ¾ to 1 second. Cylinder feed rates are controlled by conventional pneumatic flow control devices on the cylinder lines.

Figure 8:
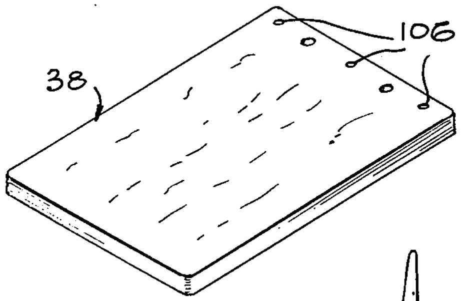
FIG. 8 is a perspective view of a stack of polymer composition material bags welded together by the automatic hot needle device of this invention.

Upper and lower limits are established by upper limit switch 100 and lower limit switch 102 (see FIG. 5) which are actuated by switchbar 104 on piston rod 62. The limit switches are connected so that station-indexing cannot occur when limit switch 100 is unactuated, and bottom dwell and reserval are accomplished by actuation of limit switch 102. When the needles are fully withdrawn to actuate switch 100, control is returned to the automatic indexing control equipment so that the wicket carriages can be advanced to another station when the proper count has been reached at the wicketer. In that advance station, the group of bags 38 (see FIGS. 8, 9 and 10) can be removed as a unit with the holes 106 formed by hot needle penetration serving as tack-welding which holds adjacent bags together, as is best seen in FIG. 9. The hot needle causes thermoplastic melting of the bag material adjacent the penetration of the hot needle and, in this way, achieves the forming of the stack of bags into a unit. The stack can then be handled as a unit during packaging, storing and insertion onto the bag-filling machine. In this way, bag attachment for handling purposes is achieved without interfering with the ease of later individual bag handling during filling.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A hot needle device for positioning as a station of a bag machine in a line of equipment for the automatic production and handling of thermoplastic bags, said hot needle device being for the attachment together into a unit of a plurality of thermoplastic bags as they are delivered to it by the line;

a machine frame;

a rail mounted on said machine frame and extending along the length thereof;

a plurality of carriages movably mounted on said rail for unidirectional movement in a first direction to and away from said hot needle device;

at least two wickets on each of said carriages for receiving thermoplastic bags and retaining them for carriage to and from said hot needle device, said hot needle device comprising;

a bracket for mounting said device on said machine frame adjacent a station where a plurality of stacked thermoplastic bags are supported on said wickets on a carriage;

a guide mounted on said bracket;

a carrier movably mounted with respect to said guide along a line in a second direction transverse to said first direction;

a hot needle mounted on said carrier, said hot needle being oriented in a direction substantially parallel to the line of motion of said carrier in said second direction, said hot needle being positioned to be movable through a stack of thermoplastic bags located on said wickets on a carriage positioned at the station; and means for moving said hot needle in said second direction along its length so that said hot needle penetrates through the stack of thermoplastic bags at the station to weld the stack of bags into a separable unit.

2. The hot needle device of claim 1 further including a tamper foot mounted on said carrier for engagement on the stack of bags to hold the stack of bags during needle penetration.

3. The device of claim 2 wherein said tamper foot is resiliently mounted on said carrier and said tamper foot is movable from an extended position where it is beyond said hot needle to a retracted position by pressure on the stack of bags in which said hot needle extends beyond said tamper foot.

4. The hot needle device of claim 3 wherein said tamper foot has a notch therein and said hot needle extends through said notch when said tamper foot is resiliently deflected.

5. The hot needle device of claim 1 wherein a cross slide is adjustably mounted on said carrier to be movable in a third direction at substantially right angles to the second direction line of motion of said carrier and transversely to the first direction of motion of said carriage, and said hot needle is mounted on said cross slide for adjustment of said hot needle in said third direction toward and away from the station for location of said hot needle with respect to the edge of a stack of thermoplastic bags on said carriage.

6. The hot needle device of claim 5 wherein a crossbar is mounted on said cross slide and said hot needle device is adjustably mounted on said crossbar for adjustment in a direction substantially normal to both the line of motion of said carrier and the direction of motion of said cross slide on said carrier.

7. The hot needle device of claim 6 wherein there are at least two hot needle devices mounted on said crossbar and there is a resiliently mounted tamper foot mounted in association with each hot needle for tamping a stack of thermoplastic bags during hot needle penetration.

8. The hot needle device of claim 7 wherein each of said hot needles is adjustably mounted on said crossbar.

9. The hot needle device of claim 8 further including a tamper foot mounted on said carrier for engagement on the stack of bags to hold the stack of bags during needle penetration.

10. The device of claim 9 wherein said tamper foot is resiliently mounted on said carrier and said tamper foot is movable from an extended position where it is beyond said hot needle to a retracted position by pressure on the stack of bags where said hot needle extends beyond said tamper foot.

11. The hot needle device of claim 10 wherein said tamper foot has a notch therein and said hot needle extends through said notch when said tamper foot is resiliently deflected.

12. The hot needle device of claim 4 wherein there is an anvil on said carriage, said anvil being positioned below said tamper foot to support bags on said carriage against said tamper foot so that the bags are clamped between said tamper foot and said anvil during needle penetration.

13. The hot needle device of claim 10 wherein there is an anvil on said carriage, said anvil being positioned below said tamper foot to support bags on said carriage against said tamper foot so that the bags are clamped between said tamper foot and said anvil during needle penetration.

14. The hot needle device of claim 11 wherein said anvil also has a notch therein and said hot needle extends through both of said notches on said tamper foot and said anvil when said hot needle is positioned to penetrate bags clamped between said tamper foot and said anvil.

* * * * *